May 9, 1961  A. P. STUART  2,983,769
SEPARATION OF DIHYDRONAPHTHALENE ISOMERS
Filed Sept. 25, 1959
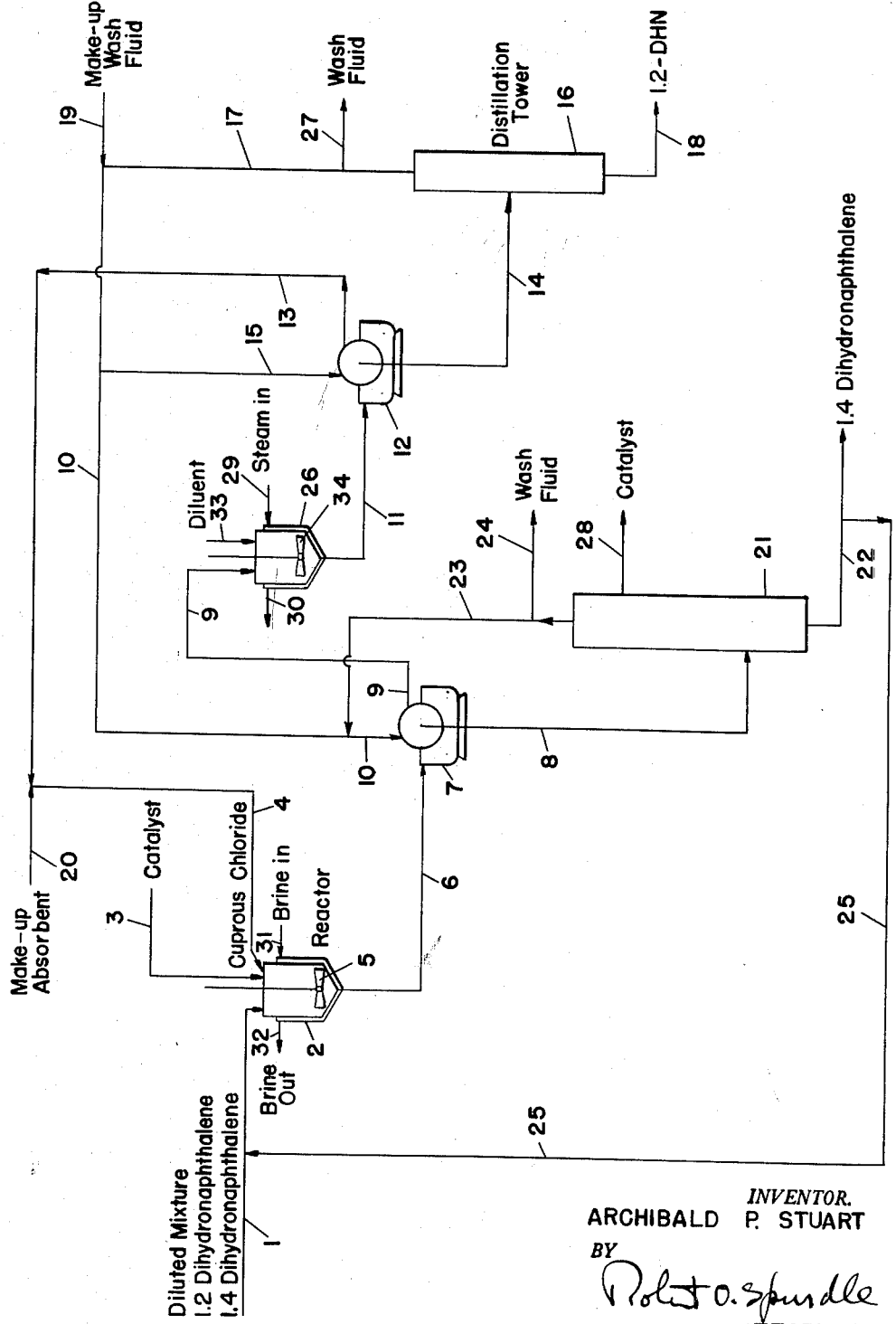
INVENTOR.
ARCHIBALD P. STUART
BY
ATTORNEY United States Patent Office 2,983,769
Patented May 9, 1961

2,983,769
SEPARATION OF DIHYDRONAPHTHALENE ISOMERS

Archibald P. Stuart, Media, Pa., assignor to Sun Oil Company, Philadelphia, Pa., a corporation of New Jersey Filed Sept. 25, 1959, Ser. No. 842,419

7 Claims. (Cl. 260—674)

This invention relates to a method of separating polycyclic aromatic olefin isomers and in particular relates to a method of separating isomers of dihydronaphthalene or derivatives thereof. It especially relates to a method of separating a mixture of 1,2-dihydronaphthalene and 1,4-dihydronaphthalene.

To those skilled in the art, it is known that the methods available of producing, as the major product, relatively pure 1,2-dihydronaphthalene or 1,4-dihydronaphthalene entail considerable difficulty, complexity, and expense. The conventional process for the partial reduction of various polycyclic aromatic hydrocarbons, such as naphthalene, consists of adding metallic sodium to a boiling solution of naphthalene in ethyl alcohol. The product obtained is a mixture of 1,2-dihydronaphthalene and 1,4-dihydronaphthalene. Separation of these isomers by physical means is often impractical or impossible. For example, the 1,2- and 1,4-dihydronaphthalene isomers have essentially the same boiling point (212° C.); consequently, separation by distillation is not feasible.

Each of the above-mentioned isomers can be obtained independently by chemical means. The 1,4-isomer can be produced by the admixing of naphthalene and metallic sodium in a specific type of reducing alcohol as described in United States Patent No. 2,473,997. The 1,2-isomer can be produced from the intermediate oxidation products of tetralin. For example, the method described in United States Patent No. 2,436,864 for the synthesis of 1,2-dihydronaphthalene embodies the oxidation of tetralin to tetralin peroxide which is decomposed to alpha tetralol and alpha tetralone. The alpha tetralol is then dehydrated to obtain 1,2-dihydronaphthalene.

These methods and other methods known to the art, of independently producing the 1,2- and 1,4-dihydronaphthalene isomers require considerable know-how in handling the complex reactions and require expensive reactants.

It is an object of the present invention to provide a relatively inexpensive, simple method of separating the 1,2- and 1,4-dihydronaphthalene isomers which are normally produced concurrently from conventional means.

The present invention is based upon the discovery that cuprous chloride will form a complex with 1,2-dihydronaphthalene when admixed under proper conditions with a mixture of 1,2- and 1,4-dihydronaphthalene. The complex is easily separable from the 1,4-isomer by physical means, such as filtration, and is dissociated by the application of heat which liberates the 1,2-dihydronaphthalene from the cuprous chloride.

The formation of compounds with cuprous chloride has been recognized by those skilled in the art as being applicable with alkenes or conjugated dienes such as styrene. A discussion of the process for separating diolefins, for example, styrene and ethylbenzene, is presented in an article by Atkinson et al. in Industrial and Engineering Chemistry, volume 50, number 10, page 1553 (October 1958). However, it was unexpected to discover that a polycyclic aromatic olefin like 1,2-dihydronaphthalene would form such a complex with cuprous chloride in accordance with the present invention.

The invention is described for the sake of convenience as being applicable to mixtures of 1,2- and 1,4-dihydronaphthalene, but other polycyclic aromatic olefins characterized by the formula

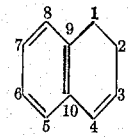

and which are unsubstituted in the (3) and (4) position are equally applicable to the complexing technique with cuprous chloride. Derivatives can be formed by substituting groups, e.g. —COOH, —CH$_2$OH, or alkyl in any or all of the other positions except the (3), (4), (9), and (10) positions and said conjugated derivatives can be separated from the unconjugated isomer by forming a complex with cuprous chloride.

According to the present invention, the reaction can be carried out at any temperature ranging from —10° C. to 35° C. Lower temperatures, to —10° C., are sometimes necessary to inhibit side reactions such as polymerization from occurring. It is preferred that temperatures be maintained between 20° C. and 25° C. The choice of a particular temperature will depend to some extent upon the reactants involved. For example, 1,4-dihydronaphthalene has a melt point of about 25° C. When the mixture of 1,2- and 1,4-isomers are admixed with cuprous chloride and the 1,2-isomer forms the complex with cuprous chloride, the 1,4-isomer would solidify unless the temperature is maintained above 25° C. or unless sufficient diluent is used to depress the freeze point of the 1,4-isomer. In addition, certain cuprous chloride complexes will begin to dissociate at about 35° C. For this reason, reaction temperature should be no greater than 35° C.

As mentioned above, the use of a diluent may be desirable. The diluent is not necessary, but is preferable since it serves to increase the fluidity of the reaction medium. The diluent can be any liquid of suitable boiling point which is a solvent for the hydrocarbon component and which is inert to cuprous chloride. The term "inert" liquid is used to mean any liquid which does not react chemically with any of the reactants or the reaction products under the conditions of use. In certain cases, the nonreactive polycyclic aromatic olefin can serve as the diluent or reaction medium. Examples of satisfactory diluents are chloroform, carbon tetrachloride, diethyl ether, pentane, hexane, isooctane and the like. Isooctane is particularly suitable and is preferred.

The amount of diluent which is used depends upon the degree of fluidity desired in the process. Usually an equal weight of diluent to dihydronaphthalene is sufficient.

Certain polycyclic aromatic olefins form a complex with cuprous chloride very slowly. Therefore, it is preferable to use a catalyst to hasten the formation of the complex. A catalyst that is suitable for use is a primary alcohol having 1 to 3 carbon atoms per molecule. For example, methyl alcohol, ethyl alcohol, and n-propyl alcohol are satisfactory as catalyst. On the other hand, isopropyl alcohol, diethylene glycol, and phenol are ineffective. Methyl alcohol is particularly suitable as a catalyst and is preferred. Less than 5 mole percent catalyst is satisfactory and it can be added either during or prior to the reaction step.

The cuprous chloride absorbent purity will have some effect on the degree of complexing that is attained. For instance, the higher the purity of cuprous chloride, the more 1,2-dihydronaphthalene that will be absorbed from the charge mixture per mole of cuprous chloride used. Chemically pure cuprous chloride is satisfactory and should be used. However, purifying chemically pure cuprous chloride by washing with sulfuric acid followed by washing with glacial acetic acid will effect increased absorptive capacity of the cuprious chloride for 1,2-dihydronaphthalene. Using technical grade cuprous chloride as an absorbent will give poor results.

The physical form of the cuprous chloride is not critical. It can be either pelleted or powdered since the complexing reaction with the 1,2-dihydronaphthalene causes the cuprous chloride to disintegrate completely. In some cases reaction with conjugated olefins causes the absorbent to swell to as much as four times its original size.

To neutralize any acid, such as hydrochloric acid, that may be formed during the reaction, a small amount (less than 5% by weight) of a fairly strong basic material, like calcium hydroxide, can be added with the cuprous chloride. Also, to inhibit the polymerization tendency of the dihydronaphthalenes a very small quantity (less than 1% by weight) of an amine, like phenyl-beta-naphthylamine, can be added with the cuprous chloride, if desired. The addition of the fairly strong basic material and the amine are preferred but are not necessary to the practice of this invention.

The invention is more specifically defined with reference to Figure 1. All quantities are in parts by weight unless otherwise stated.

A dihydronaphthalene mixture, which has been previously prepared by means known to the art, containing 50 parts of 1,2-dihydronaphthalene and 50 parts of 1,4-dihydronaphthalene is dissolved in 100 parts of isooctane. This diluted mixture is charged through conduit 1 into reactor vessel 2. From 20 to 50 parts of cuprous chloride are then added through conduit 4 into vessel 2. Methanol is added through conduit 3 into vessel 2 in amounts which can vary from 1 part to 5 parts. Brine is circulated through the jacket on vessel 2 in order to maintain the reaction temperature at about 20° C. Brine enters the jacket through line 31 and leaves the jacket through line 32. The reaction is allowed to continue for 0.5 to 3 hours during which time the entire contents of vessel 2 is agitated by means of stirrer 5. At the completion of the reaction cycle the reaction products are passed through conduit 6 into rotary drum filter 7. The filter cake is washed with pentane at about 0° C. entering the filter 7 via line 10.

The washed filter cake comprising 1,2-dihydronaphthalene and cuprous chloride are sent via line 9 to reaction vessel 26 wherein additional isooctane is added via line 33 to act as a carrier for the subsequently liberated 1,2-dihydronaphthalene. The amount of addition isooctane needed for carrier purposes will vary from 5 to 50 parts. The contents of vessel 26 are heated, by means of steam entering the jacket around vessel 26 via line 29 and leaving via line 30, to a temperature between 70° C. and 100° C. during which time the diluted complex, which is in slurry form, is agitated by means of stirrer 34. When the temperature of vessel 26 has been constant at about 80° C. for 0.5 to 3 hours the 1,2-dihydronaphthalene-cuprous chloride complex will have dissociated liberating 1,2-dihydronaphthalene of at least 98% purity and which becomes dissolved in the isooctane carrier. At the completion of the dissociation cycle the entire contents of vessel 26 are passed through conduit 11 into rotary drum filter 12 where the filter cake is washed with warm pentane which enters via line 15. The washed filter cake consists of regenerated cuprous chloride which is returned to the reaction vessel 2 through conduit 13 into conduit 4. Make-up cuprous chloride, if needed, can be added through conduit 20 into conduit 4.

The filtrate from filter 12 is passed through line 14 into distillation tower 16 whereby pentane is recovered overhead via line 27 and 1,2-dihydronaphthalene dissolved in isooctane is recovered from the bottom of tower 16 via line 18. Pentane can be returned to filters 7 and 12 as wash liquid through line 17 into lines 10 and 15. Make-up pentane, if needed can be added through line 19. The isooctane can be removed from the 1,2-dihydronaphthalene by subsequent distillation.

The filtrate from filter 7 is passed through line 8 into distillation tower 21 whereby the small amount of methanol is recovered via line 28 and pentane is recovered overhead via line 24. Pentane can be recycled as wash fluid, if needed via line 23 into line 10. Relatively pure (about 80% 1,4-isomer and 20% 1,2-isomer) 1,4-dihydronaphthalene dissolved in isooctane is recovered from the bottom of tower 21 via line 22. The diluted 1,4-dihydronaphthalene can be recycled, if desired, via line 25 into line 1.

The purity of the 1,4-dihydronaphthalene can be increased to at least 90% to 95% by using a large excess (10% to 50%) of cuprous chloride in vessel 2. The purity can also be increased by increasing the reaction time. The economic considerations of absorbent cost and vessel size for "hold-up" time will be the major criteria for determining the purity of 1,4-dihydronaphthalene to be produced.

The above-described process indicates a method whereby a mixture of 1,2-dihydronaphthalene and 1,4-dihydronaphthalene can be separated by admixing said mixture with cuprous chloride in the presence of a primary alcohol catalyst having 1 to 3 carbon atoms per molecule to selectively form a complex between the 1,2-dihydronaphthalene and the cuprous chloride and separating the 1,4-dihydronaphthalene therefrom. It is evident that multiple banks of reactors can be used to make the process semicontinuous. Other modifications within the scope of this invention will be apparent to those skilled in the art.

I claim:

1. Method of separating a conjugated polycyclic aromatic olefin, characterized by the formula

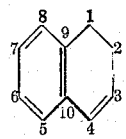

wherein the carbon atoms at the (1), (2), (5), (6), (7) and (8) positions are attached to radicals selected from the group consisting of hydrogen, carboxy, methylol, and alkyl and the carbon atoms at the (3), (4), (9) and (10) positions are unsubstituted; from a mixture containing conjugated and unconjugated polycyclic aromatic olefins, which comprises admixing said mixture with a hydrocarbon diluent which is inert to cuprous chloride, contacting the diluted mixture with cuprous chloride in the presence of a primary alcohol catalyst having 1 to 3 carbon atoms per molecule at a temperature below 35° C. to selectively form a complex between the conjugated polycyclic aromatic olefin and the cuprous chloride, separating the unconjugated polycyclic aromatic olefin and diluent from said complex, then dissociating the complex at a temperature above 35° C. and separating the conjugated polycyclic aromatic olefin from the cuprous chloride.

2. Method of separating a mixture of 1,2-dihydronaphthalene and 1,4-dihydronaphthalene which comprises admixing said mixture with a hydrocarbon diluent which is inert to cuprous chloride, contacting the diluted mixture with cuprous chloride in the presence of a primary alcohol catalyst having 1 to 3 carbon atoms per molecule at a temperature below 35° C. to selectively form a complex between the 1,2-dihydronaphthalene and the cuprous chloride, separating the 1,4-dihydronaphthalene and diluent from said complex, then dissociating the complex at a temperature above 35° C. and separating the 1,2-dihydronaphthalene from the cuprous chloride.

3. Method of separating a mixture of 1,2-dihydronaphthalene and 1,4-dihydronaphthalene which comprises admixing said mixture with a hydrocarbon diluent which is inert to cuprous chloride, contacting the diluted mixture with cuprous chloride in the presence of a primary alcohol catalyst selected from the group consisting of methyl alcohol, ethyl alcohol, and n-propyl alcohol at a temperature below 35° C. to selectively form a complex between the 1,2-dihydronaphthalene and the cuprous chloride, separating the 1,4-dihydronaphthalene and diluent from said complex, then dissociating the complex at a temperature above 35° C. and separating the 1,2-dihydronaphthalene from the cuprous chloride.

4. Method according to claim 3 wherein said primary alcohol catalyst in methyl alcohol.

5. Method of separating a mixture of 1,2-dihydronaphthalene and 1,4-dihydronaphthalene which comprises admixing said mixture with a hydrocarbon diluent which is inert to cuprous chloride, contacting the diluted mixture with cuprous chloride in the presence of a primary alcohol catalyst selected from the group consisting of methyl alcohol, ethyl alcohol, and n-propyl alcohol in an amount less than 5 mole percent, at a temperature in the range of —10° C. to 30° C. to selectively form a complex between the 1,2-dihydronaphthalene and the cuprous chloride, separating the 1,4-dihydronaphthalene and the cuprous chloride, separating the 1,4-dihydronaphthalene diluent, and catalyst from said complex, dissociating the complex at a temperature in the range of 70° C. to 100° C. and separating the 1,2-dihydronaphthalene from the cuprous chloride.

6. Method of separating a mixture of 1,2-dihydronaphthalene and 1,4-dihydronaphthalene which comprises admixing said mixture with a hydrocarbon diluent which is inert to cuprous chloride and with methyl alcohol as a catalyst in an amount less than 5 mole percent, passing the resulting mixture at a temperature in the range of —10° C. to 30° C. into a vessel containing cuprous chloride to selectively form a complex between the 1,2-dihydronaphthalene and the cuprous chloride, separating from the cuprous chloride complex mixture a solution enriched in 1,4-dihydronaphthalene, passing the cuprous chloride complex into another vessel at a temperature in the range of 70° C. to 100° C. to liberate the 1,2-dihydronaphthalene from the complex, and separating the 1,2-dihydronaphthalene from the cuprous chloride.

7. Method of separating a mixture of 1,2-dihydronaphthalene and 1,4-dihydronaphthalene which comprises admixing said mixture with a hydrocarbon diluent which is inert to cuprous chloride, passing the resulting diluted mixture into a vessel containing cuprous chloride and methyl alcohol as a catalyst in an amount less than 5 mole percent to selectively form a complex at a temperature in the range of —10° C. to 35° C. between the 1,2-dihydronaphthalene and the cuprous chloride, separating from the complex a solution enriched in 1,4-dihydronaphthalene, passing the cuprous chloride complex into another vessel at a temperature in the range of 70° C. to 100° C. to liberate the 1,2-dihydronaphthalene from the complex, and separating the 1,2-dihydronaphthalene from the cuprous chloride.

References Cited in the file of this patent

UNITED STATES PATENTS

| | | |
|---|---|---|
| 2,246,257 | Kohn | June 17, 1941 |
| 2,368,600 | Rosenstein | Jan. 30, 1945 |
| 2,392,910 | Franz | Jan. 15, 1946 |
| 2,411,105 | Nixon et al. | Nov. 12, 1946 |

FOREIGN PATENTS

| | | |
|---|---|---|
| 359,234 | Great Britain | Oct. 22, 1931 |